US008586677B2

(12) United States Patent
Harvey et al.

(10) Patent No.: US 8,586,677 B2
(45) Date of Patent: *Nov. 19, 2013

(54) FLUOROPOLYMER COATING COMPOSITIONS

(75) Inventors: Leonard W. Harvey, Downingtown, PA (US); Helen L. Brain, Merseyside (GB); Susan J. Roberts-Bleming, Cheshire (GB); Lawrence D. Leech, West Chester, PA (US); Thomas J. Bate, Glenview, IL (US)

(73) Assignee: Whitford Corporation, Elverson, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/391,353

(22) PCT Filed: Apr. 11, 2011

(86) PCT No.: PCT/US2011/031909
§ 371 (c)(1),
(2), (4) Date: Apr. 5, 2012

(87) PCT Pub. No.: WO2011/130154
PCT Pub. Date: Oct. 20, 2011

(65) Prior Publication Data
US 2013/0022740 A1   Jan. 24, 2013

Related U.S. Application Data

(60) Provisional application No. 61/324,521, filed on Apr. 15, 2010.

(51) Int. Cl.
*C08L 27/12* (2006.01)
(52) U.S. Cl.
USPC .......................................... 525/199; 525/200
(58) Field of Classification Search
USPC ........................................................ 525/199
See application file for complete search history.

(56) References Cited

U.S. PATENT DOCUMENTS

| | | | |
|---|---|---|---|
| 4,610,918 A | 9/1986 | Effenberger et al. |
| 4,654,235 A | 3/1987 | Effenberger et al. |
| 4,749,752 A | 6/1988 | Youlu et al. |
| 4,767,646 A | 8/1988 | Cordova et al. |
| 4,904,735 A | 2/1990 | Chapman, Jr. et al. |
| 4,914,158 A | 4/1990 | Yoshimura et al. |
| 4,952,630 A | 8/1990 | Morgan et al. |
| 4,960,431 A | 10/1990 | Cordova et al. |
| 5,240,660 A | 8/1993 | Marshall |
| 5,317,061 A | 5/1994 | Chu et al. |
| 5,397,629 A | 3/1995 | Jahn |
| 5,444,116 A | 8/1995 | Amin et al. |
| 5,468,798 A | 11/1995 | Leech |
| 5,473,018 A | 12/1995 | Namura et al. |
| 5,501,879 A | 3/1996 | Murayama |
| 5,560,978 A | 10/1996 | Leech |
| 5,590,420 A | 1/1997 | Gunn |
| 5,603,999 A | 2/1997 | Namura et al. |
| 5,752,278 A | 5/1998 | Gunn |
| 5,829,057 A | 11/1998 | Gunn |
| 6,021,523 A | 2/2000 | Vero |
| 6,061,829 A | 5/2000 | Gunn |
| 6,080,474 A | 6/2000 | Oakley et al. |
| 6,133,359 A | 10/2000 | Bate et al. |
| 6,143,368 A | 11/2000 | Gunn |
| 6,436,533 B1 | 8/2002 | Heffner et al. |
| 6,461,679 B1 | 10/2002 | McMeekin et al. |
| 6,531,559 B1 * | 3/2003 | Smith et al. ............ 526/255 |
| 6,548,612 B2 | 4/2003 | Smith et al. |
| 6,596,207 B1 | 7/2003 | Gunn |
| 6,649,699 B2 | 11/2003 | Namura |
| 6,673,125 B2 | 1/2004 | Miller et al. |
| 6,673,416 B1 | 1/2004 | Nishio |
| 6,737,165 B1 | 5/2004 | Smith et al. |
| 6,750,162 B2 | 6/2004 | Underwood et al. |
| 6,800,176 B1 | 10/2004 | Birchenall |
| 6,800,602 B1 | 10/2004 | Kvita et al. |

(Continued)

FOREIGN PATENT DOCUMENTS

| | | |
|---|---|---|
| EP | 0395895 B1 | 6/1993 |
| EP | 0322877 B1 | 3/1994 |

(Continued)

OTHER PUBLICATIONS

The International Search Report and Written Opinion mailed Nov. 27, 2009 in International Application No. PCT/US2009/058407.
The International Search Report and Written Opinion mailed Nov. 27, 2009 in International Application No. PCT/US2009/058444.
Written Opinion and International Search Report mailed Aug. 31, 2009 in related International Application No. PCT/US2009/044516.

(Continued)

*Primary Examiner* — Nathan M Nutter
(74) *Attorney, Agent, or Firm* — Faegre Baker Daniels LLP

(57) ABSTRACT

Blended fluoropolymer compositions that, in one exemplary application, may be applied as a coating to a substrate and, optionally, may be applied to a substrate that has been previously coated with a primer or basecoat and/or a midcoat. In one embodiment, the composition is a blend of at least one high molecular weight trace modified polytetrafluoroethyelene (TMHPTFE) and at least one melt-processible fluoropolymer (MPF). After being applied to the substrate, optionally over a primer or basecoat and/or midcoat, and then cured, the present compositions form coatings that demonstrate improved abrasion resistance and/or improved release characteristics and/or increased translucency/transparency and/or improved impermeability. The present compositions may also be used to produce films having a high degree of clarity and impermeability. The present compositions in powder form may be melt or paste extruded to form articles with improved impermeability.

27 Claims, No Drawings

(56) References Cited

U.S. PATENT DOCUMENTS

| | | |
|---|---|---|
| 6,824,872 B2 | 11/2004 | Coates et al. |
| 6,846,570 B2 | 1/2005 | Leech et al. |
| 6,867,261 B2 | 3/2005 | Bladel et al. |
| 6,872,424 B2 | 3/2005 | Linford et al. |
| 7,026,036 B2 | 4/2006 | Leech et al. |
| 7,030,191 B2 | 4/2006 | Namura |
| 7,041,021 B2 | 5/2006 | Gibson et al. |
| 7,160,623 B2 | 1/2007 | Smith et al. |
| 7,220,483 B2 | 5/2007 | Coates et al. |
| 7,276,287 B2 | 10/2007 | Smith et al. |
| 7,291,678 B2 | 11/2007 | Namimatsu |
| 8,227,548 B2 * | 7/2012 | Harvey et al. ............ 525/199 |
| 2001/0018493 A1 | 8/2001 | Lee et al. |
| 2001/0048179 A1 | 12/2001 | Stewart et al. |
| 2004/0242783 A1 | 12/2004 | Yabu et al. |
| 2004/0253387 A1 | 12/2004 | Cavero |
| 2005/0106325 A1 | 5/2005 | Nishio |
| 2006/0122333 A1 | 6/2006 | Nishio |
| 2006/0180936 A1 | 8/2006 | Japp et al. |
| 2006/0293459 A1 | 12/2006 | Yoshimoto et al. |
| 2007/0106026 A1 | 5/2007 | Namura |
| 2007/0117929 A1 | 5/2007 | Burch et al. |
| 2007/0117930 A1 | 5/2007 | Venkatarmaran et al. |
| 2007/0255012 A1 | 11/2007 | Smith et al. |
| 2009/0317553 A1 | 12/2009 | Harvey et al. |
| 2010/0080955 A1 | 4/2010 | Harvey et al. |
| 2010/0080959 A1 | 4/2010 | Harvey et al. |

FOREIGN PATENT DOCUMENTS

| | | |
|---|---|---|
| EP | 1839846 A1 | 10/2007 |
| JP | 2005-320398 A | 11/2005 |
| WO | WO00/58389 A1 | 10/2000 |
| WO | WO2006/045753 A1 | 5/2006 |
| WO | WO2007/050247 A2 | 5/2007 |
| WO | WO2007/061915 A2 | 5/2007 |
| WO | WO2009/010739 A1 | 1/2009 |
| WO | WO2009/010740 A1 | 1/2009 |
| WO | WO2010/036911 A1 | 4/2010 |
| WO | WO2010/036935 A1 | 4/2010 |
| WO | WO2011/025902 A1 | 3/2011 |
| WO | WO2011/130154 A1 | 10/2011 |

OTHER PUBLICATIONS

Written Opinion and International Search Report mailed Jul. 13, 2011 from the International Searching Authority in related International Application No. PCT/US2011/031909.

International Preliminary Report on Patentability dated Oct. 16, 2012 from WIPO relating to International Application No. PCT/US2011/031909.

* cited by examiner

FLUOROPOLYMER COATING COMPOSITIONS

CROSS REFERENCE TO RELATED APPLICATIONS

This application is a U.S. National Phase Patent Application based on International Application Serial No. PCT/US2011/031909 filed Apr. 11, 2011, which claims priority to U.S. Provisional Patent Application Ser. No. 61/324,521, filed on Apr. 15, 2010, entitled FLUOROPOLYMER COATING COMPOSITIONS, the entire disclosures of which are hereby explicitly incorporated by reference herein.

BACKGROUND OF THE INVENTION

1. Field of the Invention

The present invention relates to fluoropolymers and, in particular, relates to fluoropolymer compositions having improved properties, in which a non-stick surface and/or abrasion resistant surface is desired. In particular, the present invention relates to fluoropolymer compositions that may be used to form coatings having improved non-stick or release characteristics and/or improved abrasion resistance, as well as to form films and blended powder compositions.

2. Description of the Related Art

Fluoropolymers are long-chain polymers comprising mainly ethylenic linear repeating units in which some or all of the hydrogen atoms are replaced with fluorine. Examples include polytetrafluoroethylene (PTFE), copolymers of tetrafluoroethylene and methyl vinyl ethers, commonly referred to as methylfluoroalkoxy (MFA), copolymers of tetratfluoroethylene and hexafluoropropylene, commonly referred to as fluorinated ethylene propylene or fluoro ethylene propylene (FEP), and copolymers of tetrafluoroethylene and alkyl vinyl ethers such as propylvinyl ether, commonly referred to per-fluoroalkoxy (PFA), poly(chlorotrifluoroethylene) and poly(vinylfluoride).

Fluoropolymer coatings may be used to coat rigid substrates, such as metal substrates, for example in the field of cookware, as well as other types of metal substrates in industrial applications.

Glasscloth is one example of a flexible substrate that may be coated with a fluoropolymer coating. The coating typically includes a high molecular weight polytetrafluoroethylene (HPTFE), either by itself or including small amounts of additional polymers and/or fillers. One coating technique involves feeding a glasscloth web through a dip tank containing a dispersion of the fluoropolymer, and then feeding the coated web upwardly through a drying and sintering oven tower to cure or fix the coating. This process is usually repeated a number of times whereby up to 10 or more coating layers may be applied.

What is needed are improved fluoropolymer compositions for applications such as coatings, that demonstrate improved abrasion resistance and/or release characteristics, and for use in other applications.

SUMMARY OF THE INVENTION

The present invention provides blended fluoropolymer compositions that, in one exemplary application, may be applied as a coating to a substrate and, optionally, may be applied to a substrate that has been previously coated with a primer or basecoat and/or a midcoat. In one embodiment, the composition is a blend of at least one high molecular weight trace modified polytetrafluoroethyelene (TMHPTFE) and at least one melt-processible fluoropolymer (MPF). After being applied to the substrate, optionally over a primer or basecoat and/or midcoat, and then cured, the present compositions form coatings that demonstrate improved abrasion resistance and/or improved release characteristics and/or increased translucency/transparency and/or improved impermeability. The present compositions may also be used to produce films having a high degree of clarity and impermeability. The present compositions in powder form may be melt or paste extruded to form articles with improved impermeability.

In one form thereof, the present invention provides a fluoropolymer composition, including at least one high molecular weight polytetrafluoroethylene which has been trace modified with a modifying co-monomer (TMHPTFE) and having a number average molecular weight ($M_n$) of at least 500,000 and a first melt temperature (Tm) of less than 342° C., the at least one TMHPTFE present in an amount of between 1 wt. % and 99 wt. % based on the total solids weight of all fluoropolymers in the composition; and at least one melt-processible fluoropolymer (MPF) present in an amount of between 1 wt. % and 99 wt. % based on the total solids weight of all fluoropolymers in the composition, and having a melt flow index (MFI) greater than 10 g/10 min.

In one embodiment, the at least one TMHPTFE includes less than 1 wt. % of the modifying co-monomer. The modifying co-monomer may be selected from the group consisting of perfluoropropylvinylether (PPVE) and perfluoromethylvinylether (PMVE). The at least one TMHPTFE may have a first melt temperature (Tm) of less than 342° C.

The at least one MPF may be selected from the group consisting of perfluoroalkoxy (PFA), methylfluoroalkoxy (MFA), and fluorinated ethylene propylene (FEP), and may have a first melt temperature (Tm) of less than 312° C. The at least one TMHPTFE may be present in an amount of between 75 wt. % and 98 wt. % and said at least one MPF is present in an amount of between 2 wt. % and 25 wt. %, based on the combined solids weight of the at least one TMHPTFE and the at least on MPF. The at least one TMHPTFE and the at least one MPF may each be in the form of an aqueous dispersion.

In another embodiment, the composition lacks low molecular weight polytetrafluoroethylene (LPTFE) having a number average molecular weight ($M_n$) of less than 500,000 and, in another embodiment, the composition lacks fillers.

In another form thereof, the present invention provides a method of coating a substrate, including the steps of applying a fluoropolymer composition to the substrate, including at least one high molecular weight polytetrafluoroethylene which has been trace modified with a modifying co-monomer (TMHPTFE), having a number average molecular weight ($M_n$) of at least 500,000 and a first melt temperature (Tm) of less than 342° C., the at least one TMHPTFE present in an amount of between 1 wt. % and 99 wt. % based on the total solids weight of all fluoropolymers in the composition; and at least one melt-processible fluoropolymer (MPF) present in an amount of between 1 wt. % and 99 wt. % based on the total solids weight of all fluoropolymers in the composition, and having a melt flow index (MFI) greater than 10 g/10 min.

The method may also include, after the applying step, the additional step of curing the composition to form a coating. The applying step may also further comprise applying the fluoropolymer composition in the form of an aqueous dispersion to the substrate or spraying the fluoropolymer composition in particulate form onto the substrate.

DETAILED DESCRIPTION

The present invention provides blended fluoropolymer compositions that, in one exemplary application, may be applied as a coating to a substrate and, optionally, may be applied to a substrate that has been previously coated with a primer or basecoat and/or a midcoat. In one embodiment, the composition is a blend of at least one high molecular weight trace modified polytetrafluoroethylene (TMHPTFE) and at least one melt-processible fluoropolymer (MPF). After being applied to the substrate, optionally over a primer or basecoat and/or midcoat, and then cured, the present compositions form coatings that demonstrate improved abrasion resistance and/or improved release characteristics and/or increased translucency/transparency and/or improved impermeability. The present compositions may also be used to produce films having a high degree of clarity and impermeability. The present compositions in powder form may be melt or paste extruded to form articles with improved impermeability.

I. Substrates and Coating Types a. Rigid Substrates.

Suitable rigid substrates to which the present compositions may be applied include metals, metal alloys, and/or rigid plastic materials. Examples include articles of cookware, bakeware, small electrical appliances, fasteners, industrial components such as rollers, or any other rigid substrate to which a coating formed of the present compositions is desired. Suitable metal substrates include aluminum and steel, for example, which may or may not be pre-treated by, for example, roughening.

The rigid substrate may optionally be coated with a primer (or basecoat) and/or a midcoat prior to application of the present coating compositions. The primer and midcoat may be any type of fluoropolymer-based coating, and commercially available coatings based on high molecular weight PTFE and/or other fluoropolymers are widely available. The particular compositions of the primer and/or midcoat may vary widely, and are not thought to be critical with respect to the improved properties demonstrated by the coatings disclosed herein.

b. Flexible Substrates.

Suitable flexible substrates to which the present coating compositions may be applied include glasscloth of the type commonly used in applications such as food conveyer belts for continuous ovens, architechtural fabrics of the type used in stadium roofs and radar domes, as well as heat sealing belts, circuit boards, cooking sheets, and tenting fabrics, for example. "Glasscloth" or "glass cloth" is a textile material made of woven fibers such as, for example, linen, glass, or cotton.

Other flexible substrates that may be coated with the present coating compositions include any material including natural or synthetic fibers or filaments, including staple fiber, fiberfill, yarn, thread, textiles, nonwoven fabric, wire cloth, ropes, belting, cordage, and webbing, for example. Exemplary fibrous materials which may be coated with the present coating compositions include natural fibers, such as vegetable, animal, and mineral fibers, including cotton, cotton denim, wool, silk, ceramic fibers, and metal fibers, as well as synthetic fibers, such as knit carbon fabrics, ultra high molecular weight polyethylene (UHMWPE) fibers, poly(ethylene terephthlalate) (PET) fibers, para-aramid fibers, including poly-paraphenylene terephtalamide or Kevlar®, and meta-aramid fibers, such as Nomex®, each available from E.I. du Pont de Nemours and Company, polyphenylene sulfide fibers, such as Ryton®, available from Chevron Phillips Chemical Co., polypropylene fibers, polyacrylic fibers, polyacrylonitrile (PAN) fibers, such as Zoltek®, available from Zoltek Corporation, polyamide fibers (nylon), and nylon-polyester fibers, such as Dacron®, available from Invista North America.

The flexible substrate may optionally be coated with a primer (or basecoat) and/or a midcoat prior to application of the present coating compositions. The primer and midcoat may be any type of fluoropolymer-based coating, and commercially available coatings based on high molecular weight PTFE are widely available. The particular compositions of the primer and/or midcoat may vary widely, and are not thought to be critical with respect to the improved properties demonstrated by the coatings disclosed herein.

c. Coating Types.

In particular, in one embodiment, the present composition is applied over an underlying coating, or undercoat. The undercoat may be a basecoat, which is the coating applied directly to an underlying substrate (sometimes referred to as a primer), optionally together with one or more midcoats. In these embodiments, the present composition, when used as a coating may be referred to herein as either an "overcoat" or a "topcoat" and these terms are generally interchageable. In other embodiments, the present coating composition may be applied directly to a substrate to form a coating in direct contact with the substrate whereby the coating is not applied over any undercoats. In further embodiments, the present coating system may itself also be an undercoat.

The present compositions generally includes at least one high molecular weight trace modified polytetrafluoroethyelene (TMHPTFE) and at least one melt-processible fluoropolymer (MPF), characteristics of which are discussed below.

II. Trace Modified High Molecular Weight Polytetrafluoroethylene (TMHPTFE)

The present compositions include a first component in the form of at least one type or grade of trace modified high molecular weight polytetrafluoroethylene PTFE (TMHPTFE).

"Trace modified" as used herein, refers to high molecular weight polytetrafluoroethylene (HPTFE) that includes a small amount of modifying co-monomer, also referred to herein as "TMHPTFE", in which case the HPTFE is a co-polymer known in the art as "modified PTFE" or "trace modified PTFE". Examples of the modifying co-monomer include perfluoropropylvinylether (PPVE), other modifiers, such as hexafluoropropylene (HFP), chlorotrifluoroethylene (CTFE), perfluorobutylethylene (PFBE), or other perfluoro-alkylvinylethers, such as perfluoromethylvinylether (PMVE) or perfluoroethylvinylether (PEVE). The modifying co-monomer may be present in an amount less than 1 wt. %, for example, based on the weight of the HPTFE. The modifying co-monomer may also be present in an amount less than 0.8 wt. %, less than 0.6 wt. %, less than 0.5 wt. %, or less than 0.4 wt. %, for example, based on the weight of the HPTFE.

The number average molecular weight ($M_n$) of the TMHPTFE is typically at least 500,000, and may be at least 750,000 or at least 1,000,000, and suitable TMHPTFEs in the form of liquid dispersions and/or powders are available from many commercial sources. Liquid TMHPTFE dispersions typically include surfactants for stability, though "unstabilized" TMHPTFE dispersions, typically having less than 1.0 wt. % surfactant, are also available and may also be used. When a powder is used, the powder will typically be dispersed in a liquid to prepare the present compositions.

An alternative manner of characterizing the molecular weight of the TMHPTFE is by its first melt temperature ($T_m$), as determined by a suitable method such as differential scanning calorimetry (DSC), which first melt temperature ($T_m$) for TMHPTFE may be either equal to or less than 342° C. In other embodiments, the first melt temperature of the TMHPTFE may be either equal to or less than 340° C., either equal to or less than 338° C., or either equal to or less than 335° C.

As is known in the art, high molecular weight PTFE of the type used in the present compositions has a melt flow rate (MFR) that is very small, typically too small to measure according to the methods of ASTM D1238/ISO 1133 referenced below in connection with the MFR of the MPFs disclosed herein, therefore, the high molecular weight PTFE of the type used in the present compositions may be characterized as being non-melt flowable or having a zero MFR.

In some embodiments, the TMHPTFE is typically of the type produced by a polymerization process that is well known in the art as dispersion polymerization or emulsion polymerization. In some embodiments, however, the TMHPTFE may be of the type produced by the polymerization process well known in the art as granular or suspension polymerization, which yields PTFE known in the art as granular PTFE resin or granular PTFE molding powder. The foregoing type of TMHPTFE is also fibrillatable, meaning that it tends to fibrillate when subjected to pressure and/or shear forces.

Exemplary suitable TMHPTFE's are set forth in Table 1 below, and include D410, D310, DX9027, available from Daikin Industries, Inc. Non-trace modified HPTFE's are also set forth in Table 1 below and are used as controls in the Examples herein, including D210, available from Daikin Industries, Inc., SFN-C01, available from Chenguang R.I.C.I, Chengdu, 610036P.R. China, and 5035Z and 5050, available from Dyneon LLC.

TABLE 1

Characteristics of exemplary high molecular weight polytetrafluoroethylenes (TMHPTFE)

| Grade | PTFE type | Modifying comonomer (PPVE) content | $1^{st}$ melt point (° C.)/melt enthalpy (J/g) |
|---|---|---|---|
| D410 | TMHPTFE | 0.42 | 344.24/68.36 |
| D310 | TMHPTFE | 0.45 | 338.78/65.44 |
| DX9027 | TMHPTFE | 0.49 | 339.12/65.66 |
| D210 | HPTFE | 0 | 339.77/68.01 |
| SFN-C01 | HPTFE | 0 | 344.82/67.80 |
| 5035Z | HPTFE | 0 | 346.52/65.91 |
| 5050 | HPTFE | 0 | 343.99/73.85 |

III. Melt Processible Fluoropolymers (MPF)

The present compositions include a second component in the form of at least one type or grade of melt processible fluoropolymer (MPF).

The melt processible fluoropolymer may be a liquid dispersion of one or more melt processible fluoropolymers (MPF), such as perfluoroalkoxy (PFA) (copolymers of tetrafluoroethylene (TFE) and perfluoroalkylvinyl ethers), including methylfluoroalkoxy (MFA) (a copolymer of tetrafluoroethylene (TFE) and perfluoromethylvinyl ether (PMVE)) and ethylfluoroalkoxy (EFA) (a copolymer of tetrafluoroethylene (TFE) and perfluoroethylvinyl ether (PEVE)); and fluorinated ethylene propylene (FEP), for example.

The MPF may be produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of MPF.

In most embodiments, the MPF, after being produced by dispersion polymerization or emulsion polymerization, is thereafter not agglomerated, irradiated, or thermally degraded. In particular, the MPF will not have been subjected to any agglomeration steps during its manufacture, and therefore retains a small mean particle size as described below.

The liquid dispersion of MPF in most embodiments will be an aqueous dispersion, though the MPF may be dispersed in other solvents and/or MPF originally in an aqueous phase may be phase transferred into another solvent, such as organic solvents including hexane, acetone, or an alcohol.

The MPF, when produced as described above, will typically have a mean particle size of 1.0 microns (μm) or less, 0.9 microns (μm) or less, 0.75 microns (μm) or less, 0.5 microns (μm) or less, 0.4 microns (μm) or less, 0.3 microns (μm) or less, or 0.2 microns (μm) or less, as determined by laser scattering interferometry, for example. In particular, the MPF may have a mean particle size as low as 30, 50, 100, or 150 nm, or as large as 200, 250, or 350 nm, for example.

In other embodiments, MPF powders could also be used, which will typically be dispersed in a liquid to form the present compositions.

The MPF may be provided in the form of an aqueous dispersion which is stabilized, unstabilized, or minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the MPF aqueous dispersion. In some embodiments, the MPF dispersion may be provided in the form of an aqueous dispersion having less than 1.0 wt. % surfactant, less than 0.8 wt. % surfactant, less than 0.6 wt. % surfactant, or even less than 0.5 wt. % surfactant. In other embodiments, the MPF dispersion may be provided in the form of an aqueous dispersion that is "stabilized", typically having 1-12 wt. % surfactant.

The MPF may have a melt flow index (MFI) of at least 10, at least 12, at least 15, or at least 18, as determined by ASTM D1238/ISO 1133, in particular, ASTM D123804C. It is understood that MFI is sometimes also known in the art as melt flow rate (MFR) or melt index (MI), and is expressed as "g/10 min". The relatively high MFI of the MPFs disclosed for use in the present compositions is indicative of the MPF's having relatively low molecular weight as compared to many known MPFs.

Similar to the TMHPTFE, the molecular weight of the MPF may be characterized by its first melt temperature ($T_m$), as determined by a suitable method such as differential scanning calorimetry (DSC), which first melt temperature ($T_m$) for the MPF may be either equal to or less than 312° C., either equal to or less than 310° C., or either equal to or less than 308° C.

Also, the MPF will typically have a co-monomer content, i.e., a content of one or more monomers other than tetrafluoroethylene (TFE), of as little as 0.05 wt. %, 0.1 wt. %, or 1.5 wt. % to as much as 3.0 wt. % or greater, 4.0 wt. % or greater, 4.5 wt. % or greater, 5.0 wt. % or greater, 5.5 wt. % or greater, or 6.0 wt. % or greater.

Exemplary suitable MPFs are set forth in Table 2 below, and include MPF's having relatively higher MFI values, such as 6900Z (PFA), available from Dyneon LLC, TE9568 (FEP), available from DuPont, TE9568 (FEP), available from DuPont, Neoflon ND-110 (FEP), available from Daikin, 3F Shanghai (FEP), available from Shanghai 3F, 6300 FEP, available from Dyneon LLC, and D5220X (MFA) and 5220 (MFA), available from Solvay. Other MPFs having relatively lower MFI values are also set forth in Table 2 below, and some are used as controls in the Examples herein, including TE7224 (PFA), available from DuPont, and Hyflon XPH 6202-1 (MFA), available from Solvay.

TABLE 2

Characteristics of exemplary melt processable fluoropolymers (MPF)

| MPF (type) | Solids content (wt. %) | Mean particle size (μm) | Measured Comonomer Content % by weight | Melt flow rate (MFR) (g/10 min) | First melt temperature (DSC) (° C.) |
|---|---|---|---|---|---|
| DuPont TE7224 (PFA) | 58.6 | 0.26 | 2.21 | 2.4 | 313.0 (shoulder 321.2) |
| Dyneon 6900Z (PFA) | 49.4 | 0.31 | 0.05 | 19.4 | 310.25 |
| TE3916 (PFA) | 59.2 | — | — | — | 327.2 |
| DuPont TE9568 (FEP) | 55.6 | 0.17 | — | 11.9 | 257.84 |
| Daikin Neoflon ND-110 (FEP) | 56.5 | 0.16 | — | — | 232.83 |
| 3F Shanghai FR463A (FEP) | 24 | — | — | — | 259.9 |
| 6300 (FEP) | 55 | — | — | 10 | 255 |
| Solvay Hyflon XPH 6202-1 (MFA) | 27.2 | 0.28 | — | 4.5 | 306.31 (shoulder 287.29) |
| D5220X (MFA) | 55 | 0.18 | — | 6.5 | 310 |
| 5220 (MFA) | 55 | 0.2 | — | — | 310 |

IV. TMHPTFE/MPF Compositions

In the present compositions, based on the solids content of all fluoropolymer components of the present compositions, the TMHPTFE(s) are present in an amount of as little as 1 wt. %, 2 wt. % 4 wt. %, 10 wt. %, 30 wt. %, 35 wt. %, 40 wt. %, 45 wt. %, 55 wt. %, 60 wt. %, or 70 wt. %, or as great as 80 wt. %, 90 wt. %, 95 wt. %, 96 wt. %, or 98 wt. %, or within a range defined between any pair of the foregoing values, and the MPF(s) are present in an amount of as little as 1 wt. %, 2 wt. %, 4 wt. %, 5 wt. %, 10 wt. %, or 20 wt. %, or as great as 30 wt. %, 40 wt. %, 45 wt. %, 55 wt. %, 60 wt. %, 65 wt. %, 70 wt. %, 96 wt. %, or 98 wt. %, or within a range defined between any pair of the foregoing values.

In particular embodiments, based on the combined weight of the at least one TMHPTFE and the at least one MPF, the amount of TMHPTFE(s) present in the composition may be as little as 50 wt. %, 60 wt. %, 70 wt. %, 75 wt. %, 82 wt. %, or 90 wt. %, for example, and may as great as 70 wt. %, 75 wt. %, 82 wt. %, 90 wt. %, 96 wt. %, or 98 wt. %, for example, or within any range defined between any pair of the foregoing values and/or the values in the Examples herein, and amount of MPF(s) present in the composition may be as little as 2 wt. %, 4 wt. %, 10 wt. %, 18 wt. %, 25 wt. %, or 30 wt. %, for example, or as great as 10 wt. %, 18 wt. %, 25 wt. %, 30 wt. %, 40 wt. %, or 50 wt. %, for example, or within any range defined between any pair of the foregoing values and/or the values in the Examples herein.

In other particular embodiments, based on the combined weight of the at least one TMHPTFE and the at least one MPF, the amount of TMHPTFE(s) present in the composition may be between 70 and 98 wt. %, between 80 and 96 wt. %, between 82 and 96 wt. %, between 85 and 92 wt. %, or between 90 wt. % to 95 wt. % for example, and the MPF(s) may be present in respective corresponding amounts of between 2 and 30 wt. %, between 4 and 20 wt. %, between 4 and 18 wt. %, between 8 and 15 wt. %, or between 5 and 10 wt. %, for example, based on the total weight of all fluoropolymers in the composition.

The compositions described herein may also include suitable additives, such as engineering polymers as described above, as well as surfactants, fillers, reinforcement additives, and pigments, if desired. Compositions may also be formulated to lack any or all of the foregoing additives. In particular, the present compositions may lack fillers, such as silica, zirconia, or other inorganic fillers.

The compositions may also be formulated to lack low molecular weight polytetrafluoroethylene (LPTFE) having a number average molecular weight ($M_n$) of less than 500,000.

V. Application Procedures

To form the present compositions, aqueous dispersions of the components of the present composition may be blended in any order with slow stirring, for example, or via another low or medium shear method which minimizes the potential for agglomeration, coaglulation, or fibrillation of the fluoropolymer particles. When liquid dispersions are used, the dispersions may have varying solids contents, and one of ordinary skill in the art will recognize that the wet weights of the liquid TMHPTFE, and MPF dispersions may be selected based on the solids contents of the dispersions and the desired relative weight percent ratios of the TMHPTFE and MPF that are desired in the resulting blended compositions.

When aqueous dispersions are used, the dispersions may have varying solids contents. The wet weights of the aqueous dispersions of the first and second fluoropolymers to be blended are selected based on the solids contents of the dispersions and the desired relative weight percents of the fluoropolymers. Powders of the fluoropolymers may also be blended and then dispersed.

The compositions can be prepared by any standard formulation technique such as simple addition and low shear mixing. The compositions may be applied directly to a substrate, or may be applied over a primer and/or midcoat or may be themselves overcoated by any known technique, and are then cured to provide a coated substrate with a coating having improvements in abrasion resistance and release characteristics. The particular compositions of the primer and/or midcoat may vary widely, and are not thought to be critical with respect to the improved properties demonstrated by the coatings disclosed herein.

The fluoropolymer composition may be applied to a substrate in the form of an aqueous dispersion, followed by curing. In another embodiment, the fluoropolymer composition may be sprayed in particulate form onto a substrate, followed by curing.

The compositions may be applied to a dry film thickness (DFT) of between 5 and 80 microns, depending on the application, and may be cured at a temperature above about 350° C. for between 2 and 10 minutes, depending on the applied thickness. Depending on the application and degree of thickness desired, the compositions may be applied in several layers.

It has been found that blending of the dispersions facilitates interaction of the TMHPTFEs and MPFs on a submicron level to facilitate intimate blending such that, when the blended fluoropolymer composition is dried, a crystal structure representing a true alloy of the fluoropolymers is formed, having melt characteristics that differ from those of the individual fluoropolymers. The blended fluoropolymer composition may be used to provide a coating having improved abrasion resistance, gloss, adhesion, and higher contact angles.

VI. Physical Properties

Coatings and films prepared from the compositions described above may exhibit one or more of the following properties, together with additional properties, as evidenced by the following Examples.

The present compositions, when applied to a flexible substrate, either directly to the flexible substrate or over an underlying coating, or formed into a film, exhibits a contact angle of at least 100°, and may have a contact angle of at least 111°, 120°, 130°, or 135°, for example, as measured for a water droplet according to the Young Relation. Contact angle may be measured according to ASTM D7334-08 with any suitable commercially available instrument, such as the "Drop Shape Analysis" system (DSA10), available from Kruss GmbH of Hamburg, Germany.

The present compositions, when applied to a substrate, either directly to the substrate or over an underlying coating, or formed into a film, exhibits a surface roughness (Ra, arithmetic mean deviation of the roughness profile, measured in microns) of less than 1.5 microns, and may have a surface roughness of less than 1.3 microns, 1.2 microns, 1.0 microns, or 0.9 microns, for example, as determined according to EN ISO 13565.

The present compositions, when applied to a flexible substrate, either directly to the flexible substrate or over an underlying coating, or formed into a film, exhibits a measured gloss, in % reflectance, of at least 15, and may have a measured gloss of at least 25, 30, 35, 40, or 45, for example, as measured at 60° with any suitable commercially available instrument, such as a Microgloss 60° glossmeter, available from Byk-Gardner, in accordance with the following standards: BS3900/D5, DIN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

The present compositions, when applied to a flexible substrate, either directly to the flexible substrate or over an underlying coating, or formed into a film, exhibits a light transmission of at least 50%, and may have a measured light transmission of at least 59%, for example.

The present compositions, when applied to a flexible substrate, either directly to the flexible substrate or over an underlying coating, exhibits adhesion, as obtained in accordance with Example 2 below, of at least 3 lb/f, at least 3.5 lb/f, at least 4 lb/f, or at least 4.5 lb/f instantaneous force, and/or at least 3 lb/f, at least 3.5 lb/f, at least 4 lb/f, or at least 4.2 lb/f kinetic force, as measured by the peel test described herein.

EXAMPLES

The following non-limiting Examples illustrate various features and characteristics of the present invention, which is not to be construed as limited thereto. Throughout the Examples and elsewhere herein, percentages are by weight unless otherwise indicated.

Example 1

Exemplary Compositions and Application to a Rigid Substrate, e.g., Cookware

It is well known in the art that aqueous solutions of polyamic acid can be prepared by the dissolution of a polyamide-imide (PAI) powder in water, such as Torlon® AI-10, available from Solvay Advanced Polymers, LLC (Torlon® is a registered trademark of Solvay Advanced Polymers, LLC) in the presence of various components including amines, such as dimethylethanolamine (DMAE) and co-solvents, such as furfuryl alcohol and n-methyl pyrrolidone (NMP).

A more detailed description of the preparation of aqueous PAI solutions can be found in U.S. Pat. No. 4,014,834, the disclosure of which is expressly incorporated by reference herein. The polyamic acid solution can then be formulated into a base coat by the addition of various additives.

A typical base coat composition ("Base Coat A") was prepared, utilizing an aqueous solution of PAI prepared as described above and containing the components set forth in Table 3 below:

TABLE 3

Base Coat A

| Component | Weight % |
|---|---|
| Deionized Water | 57.8 |
| Keystone Black Dispersion | 1.8 |
| D-310 PTFE Dispersion | 9.2 |
| TE 9568 FEP Dispersion | 5.2 |
| Foamblast 389 Defoamer | 0.06 |
| Surfynol 440 | 0.79 |
| Triton X-100 | 0.11 |
| Torlon AI-10 powder | 5.63 |
| NMP | 2.70 |
| Furfuryl Alcohol | 1.54 |
| Dimethylaminoethanol (DMAE) | 1.53 |
| Ludox AM | 7.3 |
| E-330 Alumina | 4.33 |
| Ultramarine Blue | 2.0 |
| Petro AG Special Powder | 0.01 |

Test samples were prepared by spraying Base Coat A onto pre-cleaned aluminum pans, followed by heating in an oven at 100° C. for two minutes. Topcoats were then applied by spraying the primed pans with either Topcoats 1-5, the components of which are set forth in Table 4 below. The coated panels were then cured for 10 minutes in an oven at 430° C. As applied, the dry-film thickness (DFT) of the basecoat was approximately 8 μm, and that of the topcoats were approximately 25 μm.

TABLE 4

Topcoats 1-5

| COMPONENT | TOPCOATS 1 and 2 Controls (Weight %) | TOPCOATS 3 and 4 (Weight %) | TOPCOAT 5 (Weight %) |
|---|---|---|---|
| DX-9027 TMHPTFE Dispersion | 60.0 | 63.1 | 60.33 |
| TE-7224 PFA Dispersion | 4.1 | — | — |
| 6900GZ PFA Dispersion | — | 4.6 | 8.8 |
| TE-3887 LPTFE Dispersion | 3.1 | — | — |
| Foamblast 384E Defoamer | 0.1 | 0.1 | 0.1 |

TABLE 4-continued

Topcoats 1-5

| COMPONENT | TOPCOATS 1 and 2 Controls (Weight %) | TOPCOATS 3 and 4 (Weight %) | TOPCOAT 5 (Weight %) |
|---|---|---|---|
| Deionized Water | 15.75 | 15.23 | 14.56 |
| Carbopol EP-1 | 0.3 | 0.3 | 0.29 |
| Neocryl A-081-W | 7.2 | 7.3 | 6.98 |
| Keystone Black Dispersion | 0.5 | 0.5 | 0.48 |
| Iriodin 153 | 0.5 | 0.5 | 0.48 |
| Triton X-100 | 0.85 | 0.83 | 0.79 |
| Carbowax PE Glycol 1450 | 1.0 | 0.95 | 0.91 |
| Triethanolamine | 2.22 | 2.22 | 2.12 |
| Palmac 750 Oleic Acid | 0.64 | 0.64 | 0.62 |
| 12% Cerium Hexcem | 0.57 | 0.57 | 0.55 |
| Surfynol 440 | 0.54 | 054 | 0.52 |
| Aromatic 100 | 1.46 | 1.46 | 1.39 |
| DGBE glycol Ether | 1.17 | 1.17 | 1.12 |

The cured test pans were then tested by the Mechanical Scratch Adhesion Test (MSAT) and food-release properties, and the results are set forth in Table 5 below, in which Topcoat 1 and Topcoat 2 when applied over Base Coat A are referred to as controls.

Table 5 sets out the formulations and results obtained for coating compositions applied to cookware, and the detailed test protocols are given below.

TABLE 5

Summary of data obtained on cookware

| No. | Topcoat 1 Control | Topcoat 2 Control | Topcoat 3 | Topcoat 4 | Topcoat 5 |
|---|---|---|---|---|---|
| Lot Number | D9913A | D9913B | D9914AZ | D9914BZ | D9914AZ-2PFA |
| TMHPTFE used | DX9027 | DX9027 | DX9027 | DX9027 | DX9027 |
| LPTFE used | TE 3887 | TE 3887 | none | none | none |
| MPF used | TE 7224PFA | TE 7224PFA | 6900GZ PFA | 6900GZ PFA | 6900GZ PFA |
| 60° Gloss, % | 29 | 28.7 | 31.5 | 31.2 | 35.8 |
| Five-Egg Release Test, rated 1-5 with 5 best | 5 | 5 | 4.8 | 5 | 5 |
| MSAT Rating, 1-9 with 9 best (DFT, μm) | 7 (33) | 7 (30) | 6 (28) | 6 (28) | 8 (36) |
| Dry [TMHPTFE] as % total FP | 89.4% | 89.4% | 94.3% | 94.3% | 89.2% |
| Dry [LPTFE] as % total FP | 4.5% | 4.5% | 0% | 0% | 0% |
| Dry [MPF] as % total FP | 6.1% | 6.1% | 5.7% | 5.7% | 10.8 |

An examination of Table 5 reveals that Topcoats 3-5 (particularly Topcoat 5) formulated with blends of DX9027 with 6900GZ yield excellent release and gloss characteristics significantly better than Topcoats 1 and 2 which were formulated with low molecular weight PTFE (LPTFE) in accordance with U.S. patent application Ser. No. 12/567,330, filed on Sep. 25, 2009 (published as U.S. Patent Application Publication No. 2010/0080955), assigned to the assignee of the present application, the disclosure of which is incorporated by reference herein.

It is believed that such unexpected properties of the DX9027/6900GZ blends (Topcoats 3-5) arise from the relatively lower molecular weights of the TMHPTFE component as compared to other trace modified TMHPTFE grades such as D410 and/or the relatively high MFI (hence relatively low molecular weight) of the MPF component which in this case for 6900GZ has a MFI of 19.4 versus that of TE7224 which has a MFI of 2.4. The molecular weight of the TMHPTFEs is determined from the first melt peak temperature which is significantly higher for D410 though the levels of PPVE modification are similar, as shown in Table 1. Also, although the PPVE content of 6900GZ is significantly lower than that of TE7224 the former's first melt point is also very low indicating that it is a low mwt PFA material thereby yielding a high MFI.

Mechanical Scratch Adhesion Test (MSAT)

1. Scope. Coatings for cookware are susceptible to abuse and damage by scratching and cutting with metal utensils. This method describes a procedure and equipment that inflicts abuse on coatings, is reproducible, objective and quick. A weighted ball point pen tip affixed to a balance arm is placed on the coated surface which is revolving on a turntable. At the same time, the balance arm oscillates from side to side by means of a revolving cam. The turntable and cam are driven by constant speed DC motors. The speed of the turntable and cam are controlled by variable DC power supplies. The amplitude of oscillation is controlled by the degree of eccentricity in the cam. The weight is variable. By adjusting the speeds of the motors and the amplitude various scratch patterns may be obtained. These can be adjusted to cover a small or large surface area.

To further simulate the conditions encountered by coatings for nonstick cookware, the test piece (panel or pan) is covered with hot oil. The temperature of the oil is maintained with IR heat lamps and is monitored with a thermometer or thermocouple.

2. Equipment and Materials
2.1 Mechanical scratch adhesion apparatus with set of weights.
2.2 Medium point standard ball point pen refill cartridges (Pentech Part #85330 or equivalent).
2.3 Hot plate.
2.4 Cooking oil.
2.5 Thermometer or digital read out with thermocouple wire.
2.6 Small 'C' clamps.

2.7 Shallow pan approximately 10 inches (25 cm) in diameter.

2.8 Set (2 or 3) of 250 watt infrared heating lamps on stands.

3. Procedure.

3.1 Insert a ball point pen refill into the stylus assembly. (Note—a new pen refill is used for each test.) Check the balance and level of the balance arm with test piece in position. Adjust if necessary. Remove the test piece. Set the amplitude of the oscillation by choosing the proper cam setting. (Typical cam setting is the second screw hole from the center.) Set the minimum and maximum radius by loosening the balance arm retaining screw and adjusting at the extremes of the cam. Usually, a center circle of about 2 inches (51 mm) is allowed in the test pattern.

3.2 Without weight on the balance arm, and holding the pen above the turntable, adjust the speed of the turntable and the cam. It is important to adjust the speed of both the turntable and the cam so that repeating patterns are eliminated or minimized. The pen should travel in a new path over as much of the wear area as possible. Although other speeds may be acceptable, the following speeds have reduced start-up problems.

Turntable: 15 rpm. or 10 revolutions in 39.4-39.6 seconds
Cam: 21 rpm. or 10 revolutions in 28.5-28.9 seconds 3.3 Place a piece of paper on the turntable and hold in place with tape. Load the pen with a lightweight (approx. 200 grams). Place the pen on the paper and trace the scratch pattern it will follow. If a repeating pattern occurs, adjust the speed of either the turntable or cam. Save the pattern. This is also a check of the functioning of the pen. If it does not write, replace it.

3.4 Remove paper. Center pan on turntable. If testing panels, place shallow pan on turntable and place panels in pan. Panels must be of a size large enough to accommodate the size of the scratch pattern. Using 'C' clamps, anchor the pan and panel to the turntable. Holding the pen above the test piece, turn on the turntable and cam and observe several revolutions to ensure that the scratch pattern is entirely on the test piece. Turn the unit off.

3.5 Heat sufficient cooking oil to cover test surface by about ⅛ to ¼ inch (3-6 mm). Heat to test temperature, typically 300° F. (150° C.). (CAUTION: Above about 150° C., cooking oils emit fumes and strong odors. Also, they become quite flammable. If running over 150° C., conduct test in a well ventilated area, preferably in a fume hood.) Pour hot oil into pan. Position IR lamps close to pan and turn on to maintain temperature of the oil. Some pretesting of the proper position of the lamps will be required to maintain the temperature within a range of 40° F. (5° C.). Monitor every 5 minutes during test, and adjust position of the lamps to hold this tolerance. (A continuously reading temperature gauge is most convenient for this measurement.)

3.6 Place the proper weight on the balance arm. Typically, this will vary from 250 to 1000 grams, with 500 grams being used most frequently. Start both motors and place the pen gently on the coated surface. Allow the test to run for the required length of time.

4. Evaluation 4.1 Record the following information:
Speed of turntable and cam in rpm
Cam amplitude setting (number or distance from inside to outside radius in cm)
Load on pen point in grams
Temperature of oil
Duration of test
All test piece parameters (substrate and substrate preparation, coating, thickness, cure, etc.)

4.2 Remove test piece, drain oil, and wash in warm water and mild detergent. Blot dry with paper towel. Visually observe the damage to the coating. This may be done on a comparative basis against other test specimens. In general, performance levels have been rated as follows:

Mechanical Scratch Test Ratings

| | |
|---|---|
| 9 | No effect. Light scratching of the surface. No breakthrough at any place in the scratch pattern. |
| 8 | Slight. Light scratching of the surface. Inner circle of pattern is showing slight cut through to basecoat and possibly some cuts to substrate. Outer circle not cut through. |
| 6 | Moderate. Moderate scratching between inner and outer circle. Inner and outer circle both cut through to basecoat and possibly to substrate (inner usually worse that outer). |
| 4 | Considerable. Less than 25% loss of coating between inner and out circle (estimate and record amount). Considerable cut through to substrate and fraying at the inner and outer circles. |
| 2 | Severe. Between 25% to 50% loss of coating adhesion between inner and outer circle. Severe loss of coating at inner and outer circles. Metal substrate quite apparent. |
| 0 | Total Failure. Greater than 50% loss of adhesion and coating surface. |

5. Comments/Precautions.

5.1 The preferred approach to running this test is to establish a set of operating parameters for the turntable and cam speeds, the oscillating amplitude, and oil temperature. Then vary the load or time. Once this has been established, setting up individual tests proceeds quickly and smoothly.

5.2 Check the balance and oscillation of the balance arm frequently to ensure that it has not become loose and changed.

5.3 Check the speed of the turntable and cam frequently, and adjust accordingly.

5.4 This test can be run cold, i.e., without hot oil.

5.5 With a different stylus and with no rotation of the cam, this test may be run as the Ball Penetration Test, Whitford Test Method 137B. Other styli may be used as well to test for different properties.

Egg Release Test

1. Scope. This procedure is used as a quick method of determining the ability of food to be released from a nonstick coating for cookware. When used with care, this test may be used as an on-line control test to measure the consistency of production. The test is somewhat subjective and dependent upon the equipment used and the technique of the tester.

2. Equipment and Materials.

2.1 8 inch (20 cm) electric stove burner rated 1500 watts or gas range burner.

2.2 Contact pyrometer or IR temperature gun (capable of measuring to 500° F./260° C.).

2.3 Plastic, metal or coated metal spatula.

2.4 Timer or watch with second hand.

2.5 Cold, fresh, large size hen eggs.

2.6 Tap water, mild dish detergent, paper towels.

3. Procedure.

3.1 Wash coated utensil to be tested with tap water and mild detergent solution. Rinse several times in hot tap water and blot dry with a paper towel.

3.2 Turn on electric or gas burner to a medium setting ("5" on an electric burner or one-half on for gas). Allow burner to come to temperature for 3-5 minutes.

3.3 Place the utensil on the center of burner. Allow to heat while monitoring the temperature with the pyrometer or IR temperature gun. Allow the utensil to heat to 290-310° F.

(143-154° C.). Alternately, if a pyrometer is not available, the temperature may be judged by sprinkling a few drops of water onto the surface periodically as the utensil heats. The test temperature has been reached when the drops of water steam and "dance" immediately upon contact with the surface.

3.4 Crack and gently place the contents of one cold, fresh egg in the center of the utensil. Do not tip or swirl the utensil or cause the egg to run.

3.5 Allow the egg to cook for two (2) minutes undisturbed. Monitor temperature of the pan as the egg cooks. Record the temperature of the utensil. The temperature on the utensil should rise to 380-420° F. (193-215° C.) at the end of two minutes. If the end point temperature is outside this range, adjust the burner control up or down as appropriate and repeat the test. (Note: The correct burner control setting may be determined in advance using a separate utensil of the same construction as the test utensil.)

3.6 At the end of two minutes, lift egg with spatula. Free egg completely from the surface, noting the amount of effort required. Once the egg has been freed, remove the utensil from the burner and tilt. Note the ease or difficulty with which the egg slides in the bottom of the utensil.

3.7 Return utensil to burner. Turn egg over and break yolk with spatula. Allow egg to cook another two (2) minutes. Repeat Step 3.6. In addition, make note of any staining and the amount of material adhering to the utensil.

4. Evaluation.

4.1 Record effort required to free egg from surface. Egg that lifts easily from surface with no sticking around edges indicates excellent release. Diminishing release down to complete sticking may be noted by amount of effort required to lift the egg.

4.2 A numerical and descriptive rating system is as follows:

Egg Release Test Ratings

| | |
|---|---|
| Excellent (5) | No sticking in center or edges of egg. Slides easily without pushing with spatula. Leaves no mark or residue. |
| Good (4) | Slight sticking around edges. Slides easily if moved with spatula. Leaves slight mark, but no residue. |
| Fair (3) | Moderate sticking on edges; slight sticking in center. Slides only if steeply tilted and shaken, and must be pushed with spatula. Leaves mark, and slight residue. |
| Poor (2) | Requires considerable effort to free egg, but can be freed intact with spatula. Does not slide. Leaves moderate residue. |
| Very Poor (1) | Egg cannot be freed from surface without breaking up. |

4.3 If a control sample is available, record results as much better than, better than, equal, worse than or much worse than the control.

5. Comments/Precautions.

5.1 The results of this test are subjective and are best applied on a relative basis using a known standard as control. Repeatability will be good for the same tester and equipment. Repeatability will be improved with experienced testers using the same equipment.

5.2 Results may vary if utensils of different materials of construction or size are compared. In every case, the burner control settings should be adjusted to provide the same heat up profile for best correlation of results.

60° Gloss

Gloss measurements were obtained using a Microgloss 60° glossmeter, available from Byk-Gardner. The gloss meter conformed to the following standards: BS3900/D5, DIN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

Example 2

Exemplary Compositions and Application to a Flexible Substrate, e.g., Glasscloth In this Example, coatings were made from compositions of blended fluoropolymers including TMHPTFE(s) and MPF(s) in accordance with the first embodiment of present invention.

In this Example, these compositions were coated onto glasscloth over basecoats and/or midcoats, and the resulting coating systems were tested for abrasion resistance, release properties, and other properties in the remaining Examples.

The formulations of the basecoat and midcoats are set forth in Tables 6A and 6B, respectively, and are expressed as wet weight fractions whereas the topcoat components, set forth in Table 6C, are expressed as dry weight fractions.

TABLE 6A

Basecoat formulations

| Coating # | Grade of glass cloth substrate | PTFE | PFA | FEP | LPTFE | THV | Water | Solids | # of passes |
|---|---|---|---|---|---|---|---|---|---|
| Basecoat | 2116 | 0.5 | 0 | 0 | 0 | 0 | 0.5 | 30 | 2 |

TABLE 6B

Midcoat formulations

| Coating # | PTFE | PFA | FEP | LPTFE | THV | PAI | PPS | Ceramic | Water | Solids | # of passes |
|---|---|---|---|---|---|---|---|---|---|---|---|
| Midcoat | 0.92 | 0 | 0 | 0 | 0 | 0 | 0 | 0 | 0.08 | 50 | 2 |

TABLE 6C

Topcoat formulations

| Coating # | Base Coat | Mid Coat | Top Coat (PTFE) | Top coat (MFA) | Top Coat (PFA) | Top Coat (FEP) | Top Coat (LPTFE) | Coating Weight |
|---|---|---|---|---|---|---|---|---|
| Control A | PTFE | PTFE | 1 | 0 | 0 | 0 | 0 | 280 |
| Control B | PTFE | PTFE | 0 | 0 | 1 | 0 | 0 | 307 |
| Control C | PTFE | PTFE | 0.9 | 0 | 0.053 | 0 | 0.047 | 290 |
| Control D | PTFE | PTFE | 1 | 0 | 0 | 0 | 0 | 296 |
| HLB1 | PTFE | PTFE | 0.85 | 0 | 0.15 | 0 | 0 | 302 |
| HLB2 | PTFE | PTFE | 0.9 | 0 | 0.1 | 0 | 0 | 314 |
| HLB3 | PTFE | PTFE | 0.95 | 0 | 0.05 | 0 | 0 | 318 |
| HLB4 | PTFE | PTFE | 0.9 | 0 | 0.1 | 0 | 0 | 314 |
| HLB5 | PTFE | PTFE | 0.9 | 0.1 | 0 | 0 | 0 | 310 |
| HLB6 | PTFE | PTFE | 0.9 | 0 | 0 | 0.1 | 0 | 297 |
| HLB7 | PTFE | PTFE | 0.9 | 0 | 0 | 0.1 | 0 | 302 |
| HLB8 | PTFE | PTFE | 0.9 | 0 | 0.1 | 0 | 0 | 304 |
| HLB9 | PTFE | PTFE | 0.9 | 0 | 0.1 | 0 | 0 | 284 |
| HLB10 | PTFE | PTFE | 0.9 | 0 | 0.1 | 0 | 0 | 289 |
| HLB11 | PTFE | PTFE | 0.9 | 0.1 | 0 | 0 | 0 | 289 |
| HLB12 | PTFE | PTFE | 0.9 | 0 | 0 | 0.1 | 0 | 288 |
| HLB13 | PTFE | PTFE | 0.85 | 0.15 | 0 | 0 | 0 | 275 |
| HLB14 | PTFE | PTFE | 0.95 | 0.05 | 0 | 0 | 0 | 278 |
| HLB15 | PTFE | PTFE | 0.85 | 0 | 0.15 | 0 | 0 | 278 |
| HLB16 | PTFE | PTFE | 0.95 | 0 | 0.05 | 0 | 0 | 275 |
| HLB17 | PTFE | PTFE | 0.85 | 0 | 0 | 0.15 | 0 | 277 |
| HLB18 | PTFE | PTFE | 0.95 | 0 | 0 | 0.05 | 0 | 286 |
| HLB19 | PTFE | PTFE | 0.8 | 0 | 0.2 | 0 | 0 | 278 |
| HLB20 | PTFE | PTFE | 0.7 | 0 | 0.3 | 0 | 0 | 277 |
| HLB21 | PTFE | PTFE | 0.6 | 0 | 0.4 | 0 | 0 | 274 |
| HLB22 | PTFE | PTFE | 0.5 | 0 | 0.5 | 0 | 0 | 274 |

The fluoropolymer components of the Topcoats were as follows:

PTFE (TMHPTFE)—Daikin D310, solids=60% for Control A, B, and C and HLB1 to HLB 8

PTFE (TMHPTFE)—Daikin D410, solids=60% for Control D and HLB9 to HLB18

MFA—Solvay Hyflon MFA XPH 6202-1, Lot# Lab, solids=27.2%.

PFA—du Pont PFA TE7224, (Lot#0804330005, Solids=58.6%) for Control C, HLB8 and HLB10 of Table 6C the other PFA containing formulations used Dyneon 6900GZ except HLB4 which used Dyneon 691 ORG LPTFE—SFN-D, Chenguang, All of the coating compositions were mixed using a standard mixer under medium shear for 5-7 minutes. All mixed coatings were applied to glasscloth in the laboratory using draw down bars. The glasscloth substrate grades were produced by PD Interglas or Porcher Industries. The coated substrate is subjected to a flash off in a laboratory box oven set at 260° C. (500° F.) for 2 minutes followed by curing in a laboratory box oven set at 400° C. (752° F.) for 1 minute.

The basecoat, midcoat and PTFE of the topcoat of the control samples were all standard PTFE dispersions.

Roughness, Gloss and Contact Angle of Coated Glasscloth Samples

The test protocols employed for these measurements were as was given for previous examples in this document

TABLE 7

Roughness, Gloss and Contact Angle of Coated Glasscloth samples

| Formula | RA | Gloss | CA-Water |
|---|---|---|---|
| Control A | 1.37 | 15.8 | 112.02 |
| Control B | 2.79 | 7.8 | 112.94 |
| Control C | 0.91 | 36.8 | 128.08 |
| Control D | 0.87 | 32.48 | 119.37 |
| HLB1 | 0.6 | 42.83 | — |
| HLB2 | 0.78 | 36.73 | 91.91 |
| HLB3 | 0.78 | 36.08 | 107.7 |
| HLB4 | 0.72 | 36 | 109.83 |
| HLB5 | 0.96 | 40.9 | 104.51 |
| HLB6 | 0.85 | 33.47 | 110.72 |
| HLB7 | 0.89 | 30.96 | 107.58 |
| HLB8 | 0.96 | 30.05 | 111.39 |
| HLB9 | 1.17 | 29.92 | 107.06 |
| HLB10 | 1.24 | 30.24 | 119.92 |
| HLB11 | 1.19 | 30.34 | 121.24 |
| HLB12 | 1.15 | 28.68 | 112.83 |
| HLB13 | 1.53 | 37.2 | 110.54 |
| HLB14 | 0.91 | 41.4 | 112.79 |
| HLB15 | 1.09 | 41.3 | 121.92 |
| HLB16 | 1.49 | 41.5 | 110.22 |
| HLB17 | 1.33 | 36.5 | 115.13 |
| HLB18 | 1.28 | 38.4 | 103.97 |
| HLB19 | 1.39 | 39.9 | 103.37 |
| HLB20 | 2.05 | 38.5 | 118.32 |
| HLB21 | 1.45 | 35.2 | 108.39 |
| HLB22 | 1.31 | 26.3 | 114.92 |

The results in Table 7 above show a significant improvement in smoothness, and increase in gloss, and an increase in the contact angle of water over the control topcoats for coating compositions made in accordance with the first and second embodiments of the present invention when applied to flexible glass substrates. HLB1 was significantly smoother than Control C (a 3-component blend) as disclosed in U.S. patent application Ser. No. 12/567,330, filed on Sep. 25, 2009 (Published as U.S. Patent Application Publication No. 2010/0080955) and U.S. patent application Ser. No. 12/567,446, filed on Sep. 25, 2009 (Published as U.S. Patent Application Publication No. 2010/0080959), each assigned to the assignee of the present application, the disclosure of which are incorporated by reference herein.

Reciprocating Abrasion Test

A reciprocating abrasion test (RAT) was conducted on each coating under the test protocol set forth at the end of this Example. The results are set forth in Table 8 below:

TABLE 8

Reciprocating abrasion test (RAT)

| Coating # | RAT Ambient initial | RAT ambient 10% |
|---|---|---|
| Control A | 2000 | 5000 |
| Control B | 9000 | 14000 |
| Control C | 7000 | 11000 |
| Control D | 6000 | 10000 |
| HLB1 | 7000 | 10000 |
| HLB2 | 11000 | 23000 |
| HLB3 | 4000 | 6000 |
| HLB4 | 4000 | 8000 |
| HLB5 | 4000 | 7000 |
| HLB6 | 5000 | 8000 |
| HLB7 | 7000 | 10000 |
| HLB8 | 3000 | 5000 |
| HLB9 | 4000 | 7000 |
| HLB10 | 3000 | 5000 |
| HLB11 | 3000 | 5000 |
| HLB12 | 6000 | 9000 |
| HLB13 | 4000 | 6000 |
| HLB14 | 7000 | 18000 |
| HLB15 | 8000 | 13000 |
| HLB16 | 4000 | 12000 |
| HLB17 | 4000 | 13000 |
| HLB18 | 3000 | 11000 |
| HLB19 | 6000 | 10000 |
| HLB20 | 3000 | 6000 |
| HLB21 | 4000 | 6000 |
| HLB22 | 2000 | 5000 |

The results in the table above show that there is up to a 50% improvement in linear abrasion resistance with the topcoats made in accordance with the first and second embodiments of the present disclosure when applied to flexible glass substrates over the control topcoats that were formulated in accordance with the disclosures of the above-referenced U.S. patent application Ser. Nos. 12/567,330 and 12/567,446.

Reciprocating Abrasion Test Protocol (RAT)

The reciprocating abrasion test was conducted based on the complete protocol set forth below with the following modifications: (1) the coated sample were tested until 10% exposure of substrate; (2) the test was performed using a 3 kg weight at ambient temperature; and (3) the Scotchbrite 3M (7447) pads were changed every 1000 cycles.

The complete test protocol is as follows:

Scope. This test measures the resistance of coatings to abrasion by a reciprocating Scotch-Brite pad. The test subjects coating abrasion in a back and forth motion. The test is a measure of the useful life of coatings that have been subjected to scouring and other similar forms of damage caused by cleaning TM 135C is specific to a test apparatus built by Whitford Corporation of West Chester, Pa. However, it is applicable to similar test methods such as the one described in British Standard 7069-1988.

Equipment and Materials.

(1) A test machine capable of holding a Scotch-Brite abrasive pad of a specific size to the surface to be tested with a fixed force and capable of moving the pad in a back and forth (reciprocating) motion over a distance to 10-15 cm (4 to 6 inches). The force and motion are applied by a free falling, weighted stylus. The machine must be equipped with a counter, preferably one that may be set to shut off after a given number of cycles.

(2) Scotch-Brite pads of required abrasiveness cut to required size. Scotch-Brite pads are made by 3M Company, Abrasive Systems Division, St Paul, Minn. 55144-1000. Pads come in grades with varying levels of abrasiveness as follows:
Lowest—7445, 7448, 6448, 7447, 6444, 7446, 7440, 5440—Highest Scotch-Brite pads may be used at temperatures up to 150° C. (300° F.). Equivalent pads may be used.

(3) Hot plate to heat test specimens. (Optional)

(4) Detergent solution or oil for performing test in with a liquid. (Optional)

Procedure.

Before beginning the test, the end point must be defined. Usually, the end point is defined when some amount of substrate has been exposed. However, the end point may be defined as a given number of strokes even if substrate is not exposed. The present inventors use a 10% exposure of substrate over the abraded area as the standard definition of end point. Other end points may be used.

Secure the part to be tested under the reciprocating pad. The part must be firmly fastened with bolts, clamps or tape. The part should be as flat as possible and long enough so that the pad does not run off an edge. Bumps in the surface will wear first, and overrunning an edge can tear the pad and cause premature scratching and a false result.

Cut a piece of Scotch Brite of required abrasiveness to the exact size of the "foot" of the stylus. The present inventors use Grade 7447 as standard, and the "foot" of the stylus on the test machine is 5 cm (2 inches) in diameter. Attach the pad to the bottom of the "foot." The Scotch-Brite pad is fixed to the "foot" by means of a piece of "Velcro" glued to the bottom of the foot.

If the machine has an adjustable stroke length, set the required length. The present inventors use a 10 cm (4 inch) stroke length as standard. Lower the pad onto the surface of the piece to be tested. Make sure that the weight is completely free. The present inventors used a 3.0 Kg weight as standard, but this can be varied.

If the machine is equipped with a counter, set the counter to the required number of strokes. One stroke is a motion in one direction. If the machine does not have an automatic counter, the counter must be watched so that the machine can be turned off at the proper time. The machine is stopped at various intervals to change the abrasive pad. The abrasiveness of the pad changes (usually becomes less effective) as the pad fills with debris. The present inventors changed pads at intervals of 1,000 strokes. One thousand strokes is the preferred interval between pad changes.

Start the test machine. Allow to run until an end point is reached or until a required number of strokes are attained before changing the pad.

Inspect the test piece carefully at the beginning and end of each start up. As the end point is approached, the substrate will begin to show through the coating. When close to the end point, observe the test piece constantly. Stop the machine when the end point has been reached.

Evaluation.

Record the following for the test machine:
1. Grade and size of Scotch-Brite pad.
2. Load on stylus
3. Number of strokes between pad changes.
4. Length of stroke.

5. Definition of end point.
6. Number of strokes to end point.

Duplicate tests provide greater reliability. Indicate if end point is a single result or the average of several results.

Record the description of the coating, the film thickness, and the substrate and surface preparation.

If the test is conducted to a specific number of strokes, record the number of strokes. Record a description of the amount of wear, such as percent of substrate exposed, or number of strokes to first substrate exposure. Optionally, record the film thickness and/or weight before and after testing.

If the test is performed at elevated temperature, record the temperature of the test. If performed with a liquid, record the specifics of the liquid.

Comments/Precautions.

Both sides of a Scotch-Brite pad may be used. Pads must be cut precisely to fit the "foot." Ragged edges or rough spots on the pad will give false results. Test pieces must be flat and free from dirt or other particles. This test method is similar to the abrasion test described in BS 7069:1988, Appendix A1. When tested according to BS 7069, test pieces are immersed in 50 cm³ of a 5 g/liter solution of household dish washing detergent in water. The test runs for 250 cycles with pads changed every 50 cycles.

Taber Reciprocating Abrasion Test

A Taber reciprocating abrasion test was conducted according to ASTM D3389 under the following conditions: (1) the test was completed on a Taber 5135 Abraser using the weight loss method; (2) resilient Calibrase wheels H-18 were used with a 250 g load on each abraser arm, and the wheels were resurfaced every 1000 cycles; and (3) the Taber Wear Index was calculated as:

TWI=Wt(loss)(mg)/# of cycles

Taber tests generally involve mounting a specimen (typically less than 12.5 mm thickness) to a turntable platform that rotates at a fixed speed. Two abrasive wheels, which are applied at a specific pressure, are lowered onto the specimen surface. As the turntable rotates, the wheels are driven by the sample in opposite directions about a horizontal axis displaced tangentially from the axis of the sample. One abrading wheel rubs the specimen outward toward the periphery and the other, inward toward the centre while a vacuum system removes loose debris during testing.

The results are set forth in Table 9 below for the coated Glasscloth samples

TABLE 9

Taber reciprocating abrasion test of coated glasscloth samples

| Coating # | TWI 1000 | TWI 2000 | TWI 3000 |
| --- | --- | --- | --- |
| Control A | 11 | 10.5 | 10 |
| Control B | 16 | 13.5 | 12.3 |
| Control C | 19 | 19.5 | 21.3 |
| Control D | 17 | 26 | 23 |
| HLB1 | 21 | 20 | 20.7 |
| HLB2 | 16 | 18.5 | 19.3 |
| HLB3 | 38 | 32.5 | 26.3 |
| HLB4 | 19 | 16 | 17 |
| HLB5 | 24 | 30 | 45 |
| HLB6 | 23 | 28.5 | 34 |
| HLB7 | 19 | 23.5 | 18.3 |
| HLB8 | 9 | 19.5 | 29 |
| HLB9 | 39 | 34.5 | 33 |
| HLB10 | 44 | 36.5 | 33 |

TABLE 9-continued

Taber reciprocating abrasion test of coated glasscloth samples

| Coating # | TWI 1000 | TWI 2000 | TWI 3000 |
| --- | --- | --- | --- |
| HLB11 | 39 | 34 | 33.3 |
| HLB12 | 23 | 26.5 | 24.7 |
| HLB13 | 16 | 9 | 13.3 |
| HLB14 | 19 | 15 | 13 |
| HLB15 | 15 | 17 | 16 |
| HLB16 | 13 | 19 | 13.7 |
| HLB17 | 16 | 16 | 13.3 |
| HLB18 | 14 | 17.5 | 12.7 |
| HLB19 | 14 | 14 | 13.7 |
| HLB20 | 10 | 9.5 | 10.3 |
| HLB21 | 14 | 12 | 14 |
| HLB22 | 16 | 13 | 16.7 |

The results in Table 9 above show that the Taber Wear Index with the topcoats made in accordance with the first and second embodiments of the present when applied to flexible glass substrates is not significantly different than that of the Controls.

Cooking Release Tests for Coated Glasscloth Samples

The cooking release test protocols for this Example were the same as for Examples discussed earlier in this document. The results are summarized in Table 10 below.

TABLE 10

Cooking release tests for coated glasscloth samples

| Coating # | Release (Cookie) | Release (Pizza) | Release (Chicken) |
| --- | --- | --- | --- |
| Control A | 3 | 3 | 2 |
| Control B | 3 | 3 | 3 |
| Control C | 5 | 5 | 5 |
| Control D | 4 | 4 | 3 |
| HLB1 | 5 | 5 | 4 |
| HLB2 | 5 | 5 | 5 |
| HLB3 | 5 | 5 | 5 |
| HLB4 | 4 | 5 | 5 |
| HLB5 | 4 | 4 | 4 |
| HLB5 | 4 | 4 | 4 |
| HLB6 | 3 | 4 | 4 |
| HLB7 | 4 | 5 | 4 |
| HLB8 | 4 | 5 | 5 |
| HLB9 | 3 | 4 | 4 |
| HLB10 | 3 | 4 | 3 |
| HLB11 | 3 | 4 | 3 |
| HLB12 | 3 | 4 | 4 |
| HLB13 | 5 | 5 | 4 |
| HLB14 | 4 | 4 | 4 |
| HLB15 | 3 | 4 | 3 |
| HLB16 | 4 | 4 | 3 |
| HLB17 | 3 | 3 | 2 |
| HLB18 | 3 | 3 | 4 |
| HLB19 | 4 | 4 | 3 |
| HLB20 | 5 | 4 | 4 |
| HLB21 | 5 | 5 | 3 |
| HLB22 | 4 | 4 | 3 |

The results in the table above show that there is an improvement in the release, reduction in staining, and ease of cleaning characteristics for all types of food tested over the control topcoats except Control C with the topcoats made in accordance with the first and second embodiments of the present invention when applied to flexible glass substrates.

Light Transmission Test for Coated Glasscloth Samples

A light transmission test was conducted using a TES 1334 light meter, available from TES Electronic Corp. of Taipei, Taiwan. Units of measurement are lux (1×).

Samples were secured on a frame 2 inches in front of a light box and the peak reading was measured. Light transmission is expressed as a percent (%) obtained by dividing the measured 1× value for a coated sample by the measured 1× value for an uncoated sample.

The results are set forth in Table 11 below for coated glasscloth samples

TABLE 11

Light transmission test for coated glasscloth samples

| Formula | Reading - lux | % Transmission |
|---|---|---|
| No Substrate | 4.02 | |
| Control A | 0.31 | 7.71% |
| Control B | 1.41 | 35.07% |
| Control C | 2.05 | 51.00% |
| Control D | 2.01 | 50.00% |
| HLB1 | 2.04 | 50.75% |
| HLB2 | 1.84 | 45.77% |
| HLB3 | 1.67 | 41.54% |
| HLB4 | 1.82 | 45.27% |
| HLB5 | 1.92 | 47.76% |
| HLB6 | 1.86 | 46.27% |
| HLB7 | 1.84 | 45.77% |
| HLB8 | 2.19 | 54.48% |
| HLB9 | 1.97 | 49.00% |
| HLB10 | 2.02 | 50.25% |
| HLB11 | 1.98 | 49.25% |
| HLB12 | 1.94 | 48.26% |
| HLB13 | 2.20 | 54.73% |
| HLB14 | 2.38 | 59.20% |
| HLB15 | 1.95 | 48.51% |
| HLB16 | 1.72 | 42.79% |
| HLB17 | 1.67 | 41.54% |
| HLB18 | 1.79 | 44.53% |
| HLB19 | 2.26 | 56.22% |
| HLB20 | 2.00 | 49.75% |
| HLB21 | 2.34 | 58.21% |
| HLB22 | 2.20 | 54.73% |

The coatings shown here reveal similar light transmission to that of Control C (a 3-component blend).

Adhesion Test for Flexible Substrates

Adhesion tests were conducted under the following conditions: (1) the test was completed on a Lloyd LRX Tensometer; (2) Samples 25 mm wide, 200 mm in length are prepared by sealing 2 strips of fabric with PFA film (temperature 375° C., 25 seconds).

The test is conducted at a speed of 100 mm/min for a distance of 25 mm. An average reading of 3 measurements are quoted, and the units of measurement are lbs/f.

The results are set forth in Table 12 below for coated glasscloth samples.

TABLE 12

Adhesion test for coated glasscloth samples

| Coating # | Instantaneous Force (lbf) | Kinetic Force (lbf) |
|---|---|---|
| Control A | 5.93 | 4.77 |
| Control B | 5.09 | 4.23 |
| Control C | 4.74 | 3.61 |
| Control D | 5.72 | 5.49 |
| HLB1 | 3.74 | 3.83 |
| HLB2 | 4.02 | 3.72 |
| HLB3 | 3.47 | 3.21 |
| HLB4 | 4.55 | 4.12 |
| HLB5 | 3.75 | 3.81 |
| HLB6 | 3.59 | 3.49 |
| HLB7 | 3.76 | 3.47 |
| HLB8 | 4.18 | 3.19 |
| HLB9 | 4.44 | 3.85 |
| HLB10 | 4.08 | 3.25 |
| HLB11 | 4.35 | 4.22 |
| HLB12 | 4.08 | 3.89 |
| HLB13 | 3.97 | 4.14 |
| HLB14 | 3.57 | 3.33 |
| HLB15 | 4.38 | 3.67 |
| HLB16 | 4.39 | 3.79 |
| HLB17 | 4.78 | 4.12 |
| HLB18 | 3.74 | 3.75 |
| HLB19 | 3.61 | 3.09 |
| HLB20 | 3.23 | 2.92 |
| HLB21 | 3.67 | 3.51 |
| HLB22 | 4.59 | 3.91 |

The results in Table 12 show that the adhesion properties of the control topcoats are maintained in the present coating compositions when applied to flexible glass substrates, indicating that the addition of the coating compositions does not interfere with the adhesion of the coating to the substrate.

Statistical Review of the Performance of TMHPTFE/MPF Coating Compositions on Coated Glasscloth A comparison of properties of two component topcoats of the type TMHPTFE/MPF with those of the Controls is shown in Table 13 below. When all the data for all the tests are normalized, the ranking shown in the last section of Table 13 is obtained (on a 0-1 scale), where it is clearly seen that the TMHPTFE/MPF topcoats of the present invention are superior overall to those of Controls A&B and comparable to the 3 component blend Control C.

"Normalized" data are obtained from the following equations:

Normalized Surface Properties Calculation="NORM SURF"

$$\text{Mean}\{[\text{Maximum (Ra)}-(\text{Ra})]/[\text{Maximum (Ra)}-\text{Minimum (Ra)}],$$

$$[\text{Gloss}-\text{Minimum (Gloss)}]/[\text{Maximum (Gloss)}-\text{Minimum (Gloss)}],$$

$$[\text{Contact Angle}-\text{Minimum (Contact Angle)}]/[\text{Maximum (Contact Angle)}-\text{Minimum (Contact Angle)}]\}$$  Equation 1

Normalized Adhesion Calculation="NORM ADHESION"

$$\text{Mean}\{[\text{Instantaneous Force}-\text{Minimum (Instantaneous Force)}]/[\text{Maximum (Instantaneous Force)}-\text{Minimum (Instantaneous Force)}],$$

[Kinetic Force−Minimum (Kinetic Force)]/[Maximum (Kinetic Force)−Minimum (Kinetic Force)]}    Equation 2

Normalized Abrasion Calculation="NORM ABRASION"

Mean {[RAT Ambient Initial−Minimum (RAT Ambient Initial)/[Maximum (RAT Ambient Initial)−Minimum (RAT Ambient Initial)],

[RAT Ambient 10%−Minimum (RAT Ambient 10%)]/[Maximum (RAT Ambient 10%)−Minimum (RAT Ambient 10%)],

[Maximum (TWI 1000)−(TWI 1000)]/[Maximum (TWI 1000)−Minimum (TWI 1000)],

[Maximum (TWI 2000)−(TWI 2000)]/[Maximum (TWI 2000)−Minimum (TWI 2000)],

[Maximum (TWI 3000)−(TWI 3000)]/[Maximum (TWI 3000)−Minimum (TWI 3000)]}    Equation 3

Normalized Release Calculation="NORM RELEASE"

Mean {[Egg Release−Minimum (Egg Release]/[Maximum (Egg Release)−Minimum (Egg Release)],

[Release Cookie−Minimum (Release Cookie)]/[Maximum (Release Cookie)−Minimum (Release Cookie)],

[Release Pizza−Minimum (Release Pizza)]/[Maximum (Release Pizza)−Minimum (Release Pizza)],

[Release Chicken−Minimum (Release Chicken)]/[Maximum (Release Chicken)−Minimum (Release Chicken)]}    Equation 4

Normalized All Data Calculation="NORM ALL"

Mean {Normalized Surface Properties, Normalized Adhesion, Normalized Abrasion, Normalized Release}    Equation 5

That is, for each test where a maximum value is desirable the [actual values−the minimum value observed for that test] measured for all samples are divided by the range of values for that test, this normalizes the data on a 0-1 scale with 1 being best. However, if a minimum value is desirable for a test then the [maximum value−actual values] measured for all samples are divided by the range for that test, which again normalizes the data on a 0-1 scale with 1 being best. Then, to combine all tests of a certain type, e.g., release, the mean of all the normalized values is taken. A single value for all tests may then be calculated as per Equation 5 above.

TABLE 13

| Coating # | NORM ABRASION | NORM RELEASE | NORM SURF | NORM ADHESION | NORM ALL |
|---|---|---|---|---|---|
| Control A | 0.58 | 0.00 | 0.44 | 0.86 | 0.47 |
| Control B | 0.77 | 0.11 | 0.19 | 0.60 | 0.42 |
| Control C | 0.58 | 1.00 | 0.84 | 0.41 | 0.71 |
| HLB1 | 0.50 | 0.44 | 0.72 | 0.96 | 0.66 |
| HLB2 | 0.56 | 0.89 | 0.91 | 0.27 | 0.66 |
| HLB3 | 0.84 | 1.00 | 0.52 | 0.30 | 0.67 |
| HLB4 | 0.23 | 1.00 | 0.66 | 0.10 | 0.50 |
| HLB5 | 0.53 | 0.83 | 0.69 | 0.48 | 0.63 |
| HLB6 | 0.23 | 0.56 | 0.66 | 0.27 | 0.43 |
| HLB7 | 0.34 | 0.39 | 0.66 | 0.18 | 0.39 |

TABLE 13-continued

| Coating # | NORM ABRASION | NORM RELEASE | NORM SURF | NORM ADHESION | NORM ALL |
|---|---|---|---|---|---|
| HLB8 | 0.56 | 0.72 | 0.60 | 0.21 | 0.52 |
| HLB9 | 0.44 | 0.83 | 0.62 | 0.23 | 0.53 |
| HLB10 | 0.18 | 0.39 | 0.55 | 0.41 | 0.38 |
| HLB11 | 0.09 | 0.28 | 0.66 | 0.22 | 0.31 |
| HLB12 | 0.14 | 0.28 | 0.68 | 0.46 | 0.39 |
| HLB13 | 0.44 | 0.39 | 0.59 | 0.35 | 0.44 |
| HLB14 | 0.60 | 0.89 | 0.61 | 0.37 | 0.62 |
| HLB15 | 0.74 | 0.56 | 0.74 | 0.14 | 0.55 |
| HLB16 | 0.69 | 0.28 | 0.93 | 0.36 | 0.56 |
| HLB17 | 0.61 | 0.44 | 0.65 | 0.38 | 0.52 |
| HLB18 | 0.62 | 0.00 | 0.67 | 0.52 | 0.45 |
| HLB19 | 0.58 | 0.22 | 0.59 | 0.26 | 0.41 |
| HLB20 | 0.62 | 0.72 | 0.63 | 0.00 | 0.49 |
| HLB21 | 0.58 | 0.78 | 0.58 | 0.20 | 0.53 |
| HLB22 | 0.49 | 0.44 | 0.57 | 0.44 | 0.49 |

Examining Table 13 in conjunction with Table 6C which gives the formulation details we find that the mean values of "Norm All" are as follows (std errors shown):

1. Those formulations not containing D310, "NORM ALL"=0.48+/−0.03
2. Those formulations containing D310, "NORM ALL'=0.53+/−0.03
   a. Those containing D310 and not containing TE6900/6910, "NORM ALL"=0.47+/−0.03

This clearly demonstrates that formulations using D310 and Dyneon 6900 or Dyneon 6910 have overall superior properties to other fluoropolymer combinations.

Additionally, where the data is grouped by the TMHPTFE component we have:

TABLE 13A

Effect of TMHPTFE Type

| Level | Number | Mean | Std Error | Lower 95% | Upper 95% |
|---|---|---|---|---|---|
| D310- | 14 | 0.532812 | 0.02714 | 0.47667 | 0.58895 |
| D410- | 11 | 0.481470 | 0.03062 | 0.41814 | 0.54481 |
| N/A | 1 | 0.418478 | 0.10154 | 0.20842 | 0.62854 |

From this data, it may be seen that D310 is slightly preferred.

Where the data is grouped by the PFA component we have:

TABLE 13B

Effect of PFA Type

| Level | Number | Mean | Std Error | Lower 95% | Upper 95% |
|---|---|---|---|---|---|
| 6900 | 12 | 0.531167 | 0.02875 | 0.47154 | 0.59079 |
| 6910- | 1 | 0.632502 | 0.09960 | 0.42595 | 0.83906 |
| N/A | 11 | 0.484105 | 0.03003 | 0.42183 | 0.54638 |
| TE7224 | 2 | 0.421181 | 0.07043 | 0.27513 | 0.56724 |

From this data, it may be seen that Dyneon 6900/6910 is preferred.

Where MFA is compared with formulations not containing MFA we have:

TABLE 13C

| Effect of MFA vs other MPFs | | | | | |
|---|---|---|---|---|---|
| Level | Number | Mean | Std Error | Lower 95% | Upper 95% |
| D6202X | 4 | 0.494602 | 0.05212 | 0.38703 | 0.60218 |
| N/A | 22 | 0.508891 | 0.02222 | 0.46302 | 0.55476 |

From this data, no significant differences are observed. Where the data is grouped by the FEP component we have:

TABLE 13D

| Effect of FEP vs other MPFs | | | | | |
|---|---|---|---|---|---|
| Level | Number | Mean | Std Error | Lower 95% | Upper 95% |
| 3F | 1 | 0.520844 | 0.09996 | 0.31405 | 0.72764 |
| N/A | 21 | 0.521604 | 0.02181 | 0.47648 | 0.56673 |
| TE9568 | 4 | 0.424871 | 0.04998 | 0.32148 | 0.52827 |

From this data, no significant differences are observed other than those formulations containing FEP TE9568 which were inferior.

The notation "N/A" in the above Tables 13A-13D means that this group contained no polymers of the type under consideration in that table.

In view of these results, it is believed that the relatively low $1^{st}$ melt point of the D310 grade versus D410 indicates the relatively lower molecular weight of D310 since the degree of PPVE modification is similar in both cases. The combination of D310 with relatively lower molecular weight of the Dyneon PFA (and higher MFI) with respect to TE7224 yields blends with superior properties.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluoropolymer composition, comprising:
    at least one high molecular weight polytetrafluoroethylene which has been trace modified with a modifying co-monomer (TMHPTFE) and having a number average molecular weight ($M_n$) of at least 500,000 and a first melt temperature (Tm) of less than 342° C., said modifying co-monomer present in an amount of less than 1 wt. %, based on the weight of said TMHPTFE, said at least one TMHPTFE present in an amount of between 50 wt. % and 90 wt. % based on the total solids weight of all fluoropolymers in said composition;
    at least one melt-processable fluoropolymer (MPF) selected from perfluoroalkoxy (PFA) and methylflouroalkoxy (MFA), said MPF present in an amount of between 10 wt. % and 50 wt. % based on the total solids weight of all fluoropolymers in said composition, and having a melt flow index (MFI) greater than 10 g/10 min; and
    wherein said composition lacks low molecular weight polytetrafluoroethylene (LPTFE) having a number average molecular weight ($M_n$) of less than 500,000.

2. The composition of claim 1, wherein said modifying co-monomer is perfluoropropylvinylether (PPVE).

3. The composition of claim 1, wherein said at least one MPF has a first melt temperature (Tm) of less than 312° C.

4. The composition of claim 1, wherein said at least one TMHPTFE is present in an amount of between 82 wt. % and 90 wt. % and said at least one MPF is present in an amount of between 10 wt. % and 18 wt. %, based on the combined solids weight of said at least one TMHPTFE and said at least on MPF.

5. The composition of claim 1, wherein said at least one TMHPTFE and said at least one MPF are each in the form of an aqueous dispersion.

6. The composition of claim 1, wherein said composition lacks fillers.

7. A method of coating a substrate, comprising the steps of:
    applying a fluoropolymer composition to the substrate, comprising:
        at least one high molecular weight polytetrafluoroethylene which has been trace modified with a modifying co-monomer (TMHPTFE), having a number average molecular weight ($M_n$) of at least 500,000 and a first melt temperature (Tm) of less than 342° C., said modifying co-monomer present in an amount of less than 1 wt. %, based on the weight of said TMHPTFE, the at least one TMHPTFE present in an amount of between 50 wt. % and 90 wt. % based on the total solids weight of all fluoropolymers in the composition; and
        at least one melt-processable fluoropolymer (MPF) selected from perfluoroalkoxy (PFA) and methylflouroalkoxy (MFA), the MPF present in an amount of between 10 wt. % and 50 wt. % based on the total solids weight of all fluoropolymers in the composition, and having a melt flow index (MFI) greater than 10 g/10 min.; and
        wherein the composition lacks low molecular weight polytetrafluoroethylene (LPTFE) having a number average molecular weight ($M_n$) of less than 500,000.

8. The method of claim 7, further comprising, after said applying step, the additional step of curing the composition to form a coating.

9. The method of claim 7, wherein said applying step further comprises applying the fluoropolymer composition in the form of an aqueous dispersion to the substrate.

10. The method of claim 7, wherein said applying step further comprises spraying the fluoropolymer composition in particulate form onto the substrate.

11. The composition of claim 1, wherein said TMHPTFE is obtained from emulsion polymerization.

12. The composition of claim 1, wherein said TMHPTFE is obtained from suspension polymerization.

13. The composition of claim 1, wherein said MPF has a melt flow index (MFI) greater than 15 g/10 min.

14. The method of claim 7, wherein the fluoropolymer composition is a topcoat and further comprising, prior to said applying step, the additional steps of:
    applying and curing a basecoat; and
    applying and curing midcoat.

15. The method of claim 7, wherein the MPF has a melt flow index (MFI) greater than 15 g/10 min.

16. The method of claim 7, wherein the composition lacks fillers.

17. A fluoropolymer composition, comprising:
    at least one high molecular weight polytetrafluoroethylene which has been trace modified with a modifying co-monomer (TMHPTFE) and having a number average molecular weight ($M_n$) of at least 500,000 and a first melt temperature (Tm) of less than 342° C., said modifying co-monomer present in an amount of less than 1 wt. %, based on the weight of said TMHPTFE, said at least one TMHPTFE present in an amount of between 85 wt. % and 92 wt. % based on the total solids weight of all fluoropolymers in said composition;

at least one melt-processible fluoropolymer (MPF) selected from perfluoroalkoxy (PFA) and methylflouroalkoxy (MFA), said MPF present in an amount of between 8 wt. % and 15 wt. % based on the total solids weight of all fluoropolymers in said composition, and having a melt flow index (MFI) greater than 10 g/10 min; and wherein said composition lacks low molecular weight polytetrafluoroethylene (LPTFE) having a number average molecular weight ($M_n$) of less than 500,000.

18. The composition of claim 17, wherein said modifying co-monomer is perfluoropropylvinylether (PPVE).

19. The composition of claim 17, wherein said MPF has a melt flow index (MFI) greater than 15 g/10 min.

20. The composition of claim 17, wherein said at least one TMHPTFE and said at least one MPF are each in the form of an aqueous dispersion.

21. The composition of claim 17, wherein said composition lacks fillers.

22. The composition of claim 17, wherein said TMHPTFE is obtained from emulsion polymerization.

23. A fluoropolymer composition, comprising:
a blend of fluoropolymers in aqueous dispersion form, said fluoropolymers consisting of:

at least one high molecular weight polytetrafluoroethylene which has been trace modified with a modifying co-monomer (TMHPTFE) and having a number average molecular weight ($M_n$) of at least 500,000 and a first melt temperature (Tm) of less than 342° C., said modifying co-monomer present in an amount of less than 1 wt. %, based on the weight of said TMHPTFE, said at least one TMHPTFE present in an amount of between 50 wt. % and 90 wt.% based on the total solids weight of all fluoropolymers in said composition; and at least one melt-processible fluoropolymer (MPF) selected from perfluoroalkoxy (PFA) and methylflouroalkoxy (MFA), said MPF present in an amount of between 10 wt. % and 50 wt. % based on the total solids weight of all fluoropolymers in said composition, and having a melt flow index (MFI) greater than 10 g/10 min; and optional additives.

24. The composition of claim 23, wherein said modifying co-monomer is perfluoropropylvinylether (PPVE).

25. The composition of claim 23, wherein said MPF has a melt flow index (MFI) greater than 15 g/10 min.

26. The composition of claim 23, wherein said composition lacks fillers.

27. The composition of claim 23, wherein said TMHPTFE is obtained from emulsion polymerization.

* * * * *